(12) United States Patent
Kuraki et al.

(10) Patent No.: US 9,005,567 B2
(45) Date of Patent: Apr. 14, 2015

(54) METHOD FOR PRODUCING ISOLATABLE OXIDE MICROPARTICLES OR HYDROXIDE MICROPARTICLES

(75) Inventors: Jun Kuraki, Izumi (JP); Kaeko Araki, Izumi (JP); Masaki Maekawa, Izumi (JP); Daisuke Honda, Izumi (JP); Masakazu Enomura, Izumi (JP)

(73) Assignee: M. Technique Co., Ltd., Izumi-shi (JP)

( * ) Notice: Subject to any disclaimer, the term of this patent is extended or adjusted under 35 U.S.C. 154(b) by 243 days.

(21) Appl. No.: 13/818,954

(22) PCT Filed: Aug. 26, 2011

(86) PCT No.: PCT/JP2011/069290
§ 371 (c)(1),
(2), (4) Date: Feb. 25, 2013

(87) PCT Pub. No.: WO2012/026579
PCT Pub. Date: Mar. 1, 2012

(65) Prior Publication Data
US 2013/0156682 A1    Jun. 20, 2013

(30) Foreign Application Priority Data
Aug. 26, 2010    (JP) .................................. 2010-190101

(51) Int. Cl.
*C01B 13/14* (2006.01)
*C01G 23/047* (2006.01)
(Continued)

(52) U.S. Cl.
CPC ........ *C01G 23/0536* (2013.01); *B01F 7/00775* (2013.01); *B01F 7/00791* (2013.01);
(Continued)

(58) Field of Classification Search
CPC .... C01G 23/0536; C01G 25/02; B82Y 30/00; B01D 9/009; C01F 5/14; C01F 5/20; C01F 5/02; B01F 7/00791; B01F 7/00775; C01B 13/36; C01P 2002/54; C01P 2004/64; C01P 2004/04

USPC ....................................... 423/579, 610, 592.1
See application file for complete search history.

(56) References Cited

U.S. PATENT DOCUMENTS 5,189,476 A *   2/1993  Anno et al. ................... 399/280
6,555,953 B1 *  4/2003  Nishizawa et al. ........... 313/461
(Continued)

FOREIGN PATENT DOCUMENTS

JP      5-147943 A     6/1993
JP     10-510238 A    10/1998
(Continued)

*Primary Examiner* — Anthony J Zimmer
(74) *Attorney, Agent, or Firm* — Birch, Stewart, Kolasch & Birch, LLP

(57) ABSTRACT

A method for producing isolatable oxide microparticles or hydroxide microparticles using an apparatus that processes a fluid between processing surfaces of processing members that are arranged opposite each other so as to be able to approach to or separate from each other and such that at least one can rotate relative to the other. At least two fluids are mixed and oxide microparticles or hydroxide microparticles are separated, said two fluids including: a fluid containing a microparticle raw material solution comprising a microparticle raw material mixed into a solvent, and a fluid containing a microparticle-separation solution. Immediately thereafter, the following are mixed to obtain isolatable oxide microparticles or hydroxide microparticles: a fluid containing the separated oxide microparticles or hydroxide microparticles; and a fluid containing a microparticle-treatment-substance-containing solution that contains a microparticle-treatment substance that adjusts the dispersibility of the separated oxide microparticles or hydroxide microparticles.

20 Claims, 10 Drawing Sheets

(51) Int. Cl.

| | | |
|---|---|---|
| *C01G 23/053* | (2006.01) | |
| *B01F 7/00* | (2006.01) | |
| *C01B 13/36* | (2006.01) | |
| *C01F 5/02* | (2006.01) | |
| *C01F 5/20* | (2006.01) | |
| *C01F 5/14* | (2006.01) | |
| *C01F 17/00* | (2006.01) | |
| *B01D 9/00* | (2006.01) | |
| *C01G 25/02* | (2006.01) | |
| *C01G 1/02* | (2006.01) | |
| *B82Y 30/00* | (2011.01) | |

(52) U.S. Cl.
CPC . *C01B13/36* (2013.01); *C01F 5/02* (2013.01); *C01F 5/20* (2013.01); *C01F 5/14* (2013.01); *C01F 17/0043* (2013.01); *B01D 9/0009* (2013.01); *C01G 23/0532* (2013.01); *C01G 25/02* (2013.01); *C01G 1/02* (2013.01); *B82Y 30/00* (2013.01); *C01P 2004/04* (2013.01); *C01P 2002/54* (2013.01); *C01P 2004/64* (2013.01)

(56) References Cited

U.S. PATENT DOCUMENTS

| | | | | |
|---|---|---|---|---|
| 7,711,308 | B2* | 5/2010 | Hozumi et al. | 399/351 |
| 2005/0281588 | A1* | 12/2005 | Okuda et al. | 399/254 |
| 2006/0182467 | A1* | 8/2006 | Aoki et al. | 399/254 |
| 2006/0239723 | A1* | 10/2006 | Okuda et al. | 399/272 |
| 2010/0155310 | A1* | 6/2010 | Enomura | 209/668 |
| 2010/0202960 | A1 | 8/2010 | Enomura | |
| 2010/0237522 | A1* | 9/2010 | Enomura | 264/8 |
| 2010/0243947 | A1* | 9/2010 | Enomura | 252/62.55 |
| 2011/0015054 | A1* | 1/2011 | Enomura | 501/137 |

FOREIGN PATENT DOCUMENTS

| | | |
|---|---|---|
| JP | 2010-105892 A | 5/2010 |
| WO | WO 2009/008392 A1 | 1/2009 |
| WO | WO 2009/035019 A1 | 3/2009 |

\* cited by examiner (A)

(B)

(C)

(A)

(B)

(A)

(B)

METHOD FOR PRODUCING ISOLATABLE OXIDE MICROPARTICLES OR HYDROXIDE MICROPARTICLES

The present invention relates to a method for producing isolatable oxide microparticles or hydroxide microparticles.

BACKGROUND ART

Oxides, hydroxides, or oxides such as a hydroxylated oxide are used in various fields; especially microparticles thereof are widely used in such fields as an abrading agent, a catalyst, cosmetics, an electronic apparatus, a magnetic substance, a pigment and a coating material, and a semiconductor.

Oxides, hydroxides, or oxides such as a hydroxylated oxide can improve their properties by making them microparticles; and these microparticles are produced generally by a sol-gel reaction or a sol-gel reaction followed by calcination as shown in Patent Document 1, and a hydrothermal reaction as shown in Patent Documents 2 and 3.

However, when general production methods as mentioned above are used, dispersion of oxide microparticles or hydroxide particles is poor in many cases; especially the oxide which is produced by calcination forms a bound agglomeration of primary particles so strongly that they are occasionally fused together. Because of this, when the oxides and the hydroxides thus produced are dispersed into various solvents or resins, they are dispersed often by mechanical grinding or mechanical crushing by using such machines as a ball mill and a bead mill. However, oxide particles in the oxide particle dispersion solution or hydroxide particles in the hydroxide particle dispersion solution, if these particles are produced, by the foregoing methods, had problems of not expressing expected semiconductor properties, transparency, spectroscopic properties, durability, and so forth, because there is a strong force acting on particles (crystals).

Applicant of the present invention provided, as shown in Patent Document 4, a method to produce oxide microparticles wherein the microparticles are separated in a thin film fluid which is passing between processing surfaces which are disposed in a position they are faced with each other; but a method to produce oxide microparticles having improved dispersibility has not been disclosed specifically. Accordingly, a method to produce oxide microparticles or hydroxide microparticles having improved dispersibility has been eagerly wanted.

PRIOR ART DOCUMENTS

Patent Document

Patent Document 1: Japanese Patent Laid-Open Publication No. 2010-105892

Patent Document 2: Japanese Patent Application Publication No. 1998-510238

Patent Document 3: Japanese Patent Laid-Open Publication No. 1993-147943

Patent Document 4: International Patent Laid-Open Publication No. 009/008392

DISCLOSURE OF INVENTION

Problems to be Solved by the Invention

The present invention is made to solve the problems as mentioned above; and thus, the object thereof is to provide a method for producing isolatable oxide microparticles or hydroxide microparticles.

Means for Solving the Problems

Inventors of the present invention carried out an extensive investigation, and as a result, they found that isolatable oxide microparticles or hydroxide microparticles can be obtained by a method wherein a fluid which contains a microparticle raw material solution obtained by mixing this microparticle raw material with a solvent is mixed with a fluid which contains a microparticle-separating solution between at least two processing surfaces which are disposed in a position they are faced with each other so as to be able to approach to and separate from each other, at least one of which rotates relative to the other, thereby separating oxide microparticles or hydroxide microparticles, and then, a dispersion solution of the separated oxide microparticles or hydroxide microparticles is mixed with a fluid which contains a microparticle-treating substance solution obtained by mixing a microparticle-treating substance with a solvent.

An invention according to claim 1 of the present application relates to a method for producing isolatable oxide microparticles or hydroxide microparticles, wherein each of (I) a microparticle raw material solution which is obtained by mixing at least one microparticle raw material with a solvent, (II) a microparticle-separating solution, and (III) a microparticle-treating substance solution which is obtained by mixing at least one microparticle-treating substance with a solvent is prepared, wherein the method comprises:

(IV) a step of separating oxide microparticles or hydroxide microparticles, wherein at least two fluids to be processed are used:

out of them, at least one fluid is the fluid which contains the microparticle raw material solution and at least one fluid other than the microparticle raw material solution is the fluid which contains the microparticle-separating solution, wherein the fluid which contains the microparticle raw material solution is mixed with the fluid which contains the microparticle-separating solution in a thin film fluid formed between at least two processing surfaces which are disposed in a position they are faced with each other so as to be able to approach to and separate from each other, at least one of which rotates relative to the other, and (V) a step of mixing a fluid which contains the oxide microparticles or the hydroxide microparticles separated in the step (IV) with the fluid which contains the microparticle-treating substance solution, wherein the microparticle-treating substance is a substance which controls dispersibility of the said separated oxide maicroparticles or hydroxide microparticles.

An invention according to claim 2 of the present application provides the method for producing isolatable oxide microparticles or hydroxide microparticles according to claim 1, wherein any one of the fluid which contains the microparticle raw material solution and the fluid which contains the microparticle-separating solution passes between the processing surfaces with forming the thin film fluid, a separate introduction path independent of a flow path through which any one of the fluids passes is arranged, at least any one of the at least two processing surfaces is provided with an opening to the introduction path, any other one of the fluid which contains the microparticle raw material solution and the fluid which contains the microparticle-separating solution is introduced between the processing surfaces through the opening, whereby mixing the fluid which contains the microparticle raw material solution with the fluid which contains the microparticle-separating solution in the thin film fluid.

An invention according to claim 3 of the present application provides the method for producing isolatable oxide microparticles or hydroxide microparticles according to claim 1 or 2, wherein the method comprises:

a step of separating oxide microparticles or hydroxylated oxide microparticles by mixing the fluid which contains the microparticle raw material solution with the fluid which contains the microparticle-separating solution in the thin film fluid formed between at least two processing surfaces which are disposed in a position they are faced with each other so as to be able to approach to and separate from each other, at least one of which rotates relative to the other, and a step of mixing the fluid which contains the oxide microparticles or the hydroxide microparticles separated in the above-mentioned step with the fluid which contains the microparticle-treating substance solution, wherein these steps are carried out continuously.

An invention according to claim 4 of the present application provides the method for producing isolatable oxide microparticles or hydroxide microparticles according to claim 3, wherein at least any one of the at least two processing surfaces is provided with an opening to introduce the fluid which contains the microparticle-treating substance solution between the processing surfaces, the fluid which contains the microparticle raw material solution is mixed with the fluid which contains the microparticle-separating solution in the thin film fluid to separate oxide microparticles or hydroxide microparticles, and thereafter, the microparticle-treating substance is contacted with and acted to the separated oxide microparticles or hydroxide microparticles in the thin film fluid.

An invention according to claim 5 of the present application provides the method for producing isolatable oxide microparticles or hydroxide microparticles according to claim 3, wherein an opening to supply the fluid which contains the microparticle-treating substance solution is arranged in a position to face a discharge part of the at least two processing surfaces, the fluid which contains the microparticle raw material solution is mixed with the fluid which contains the microparticle-separating solution in the thin film fluid to separate the oxide microparticles or the hydroxide microparticles thereby discharging the fluid which contains the oxide microparticles or the hydroxide microparticles through the discharge part, and immediately thereafter, the microparticle-treating substance is contacted with and acted to the separated oxide microparticles or hydroxide microparticles.

An invention according to claim 6 of the present application provides the method for producing isolatable oxide microparticles or hydroxide microparticles according to any of claims 1 to 5, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

An invention according to claim 7 of the present application provides the method for producing isolatable oxide microparticle or hydroxide microparticle according to any of claims 1 to 6, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

An invention according to claim 8 of the present application provides the method for producing isolatable oxide microparticles or hydroxide microparticles according to any of claims 1 to 7, wherein the microparticle-treating substance is an acidic substance or a hydrogen peroxide.

Advantages

According to the present invention, isolatable oxide microparticles or hydroxide microparticles can be obtained more readily with a lower energy and a lower cost than ever so that isolatable oxide microparticles or hydroxide microparticles can be provided cheaply and stably.

BEST MODES FOR CARRYING OUT THE INVENTION

Figure 1:
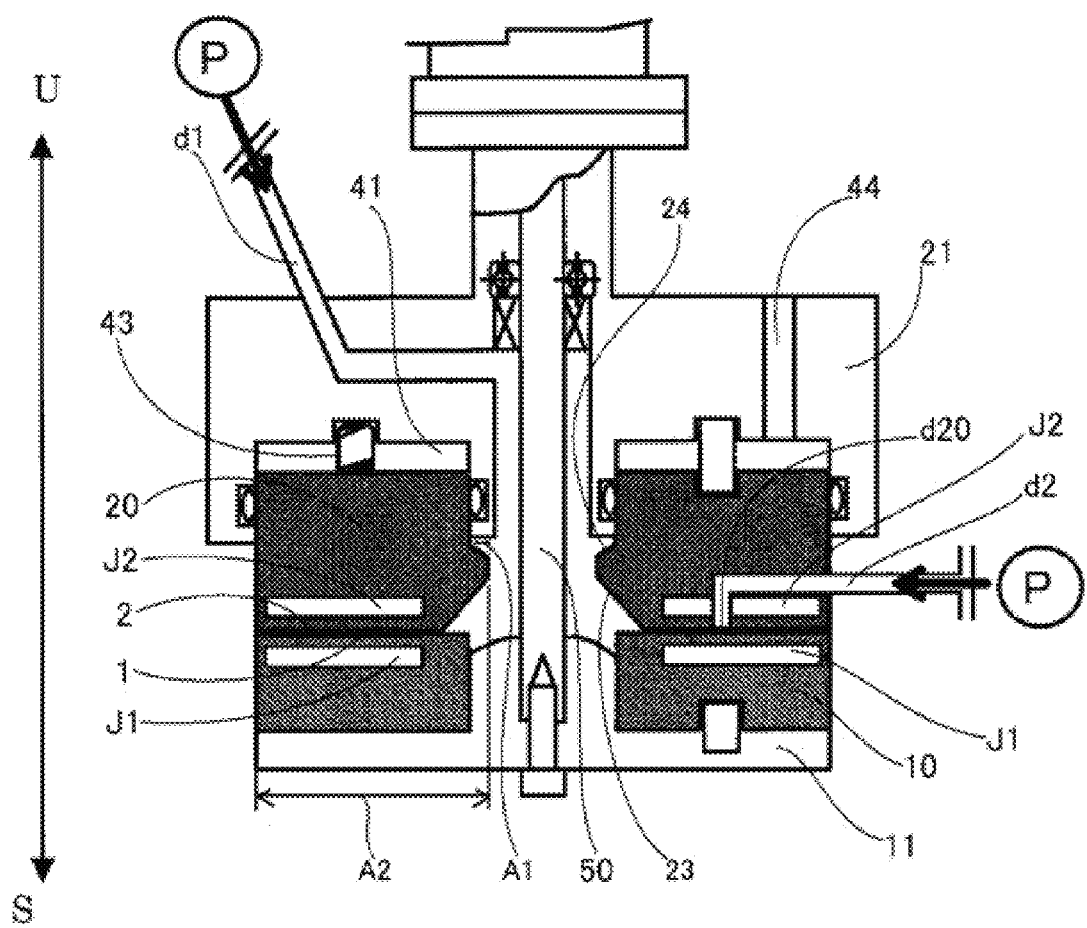
FIG. 1 is a schematic sectional view showing the fluid processing apparatus according to an embodiment of the present invention.

Hereinafter, detailed explanation of the present invention will be made; but a technical range of the present invention is not limited by the following Embodiments and Examples.

Although there is no particular restriction as to oxide or hydroxide of the present invention, such as for example, metal oxide or non-metal oxide having the formula of $M_xO_y$, metal hydroxide or a non-metal hydroxide having the formula of $M_p(OH)_q$, metal hydroxide oxide or non-metal hydroxide oxide having the formula of $M_r(OH)_sO_t$, various solvated forms of them, composition containing these substances as main components, and so forth may be mentioned (in the formulae, each of x, y, p, q, r, s, and t is an arbitrary integer). The oxide, the hydroxide or the hydroxide oxide includes peroxide, superoxide, and so forth.

The metal or the non-metal which constitutes the foregoing oxides and hydroxides is not particularly restricted; and thus, all elements in the periodic table may be used. An illustrative example of the metal element includes Ti, Fe, W, Pt, Au, Cu, Ag, Pd, Ni, Mn, Co, Ru, V, Zn, and Zr; and an illustrative example of the non-metal element includes B, Si, Ge, N, and C. These elements may form an oxide, a hydroxide, or a hydroxylated oxide singly or in a combination of plurality of these elements (composite oxide, composite hydroxide, and composite hydroxylated oxide).

Although there is no particular restriction as to the metal oxide or the non-metal oxide having the formula of $M_xO_y$ in the present invention, such as for example, $TiO_2$, $SnO$, $SnO_2$, $Al_2O_3$, $SiO_2$, $ZnO$, $CoO$, $CO_3O_4$, $Cu_2O$, $CuO$, $Ni_2O_3$, $NiO$, $MgO$, $Y_2O_3$, $VO$, $VO_2$, $V_2O_3$, $V_2O_5$, $MnO$, $MnO_2$, $CdO$, $ZrO_2$, $PdO$, $PdO_2$, $MoO_3$, $MoO_2$, $Cr_2O_3$, $CrO_3$, $In_2O_3$, or $RuO_2$ may be mentioned.

Although there is no particular restriction as to the metal hydroxide or the non-metal hydroxide having the formula of $M_p(OH)_q$ in the present invention, such as for example, $Sn(OH)_2$, $Sn(OH)_4$, $Al(OH)_3$, $Si(OH)_4$, $Zn(OH)_2$, $Co(OH)_2$, $Co(OH)_3$, $CuOH$, $Cu(OH)_2$, $Ni(OH)_3$, $Ni(OH)_2$, $Mg(OH)_2$, $Y(OH)_3$, $V(OH)_2$, $V(OH)_4$, $V(OH)_3$, $Mn(OH)_2$, $Mn(OH)_4$, $Cd(OH)_2$, $Zr(OH)_4$, $Pd(OH)_2$, $Pd(OH)_4$, $Mo(OH)_4$, $Cr(OH)_3$, and $Ru(OH)_4$ may be mentioned. Although there is no particular restriction in the metal hydroxide oxide or the non-metal hydroxide oxide having the formula of $M_r(OH)_sO_t$, FeOOH, MnOOH, NiOOH, AlOOH, and so forth may be mentioned.

The term "isolatable" in the present invention means that particles in the state of agglomeration can be dispersed, or that fusion of particles after calcination treatment can be suppressed. Accordingly, this means that dispersibility of the obtained oxide microparticles or hydroxide microparticles into a solvent or a resin is improved.

The microparticle raw material solution in the present invention is not particularly restricted as far as at least one kind of the microparticle raw material is mixed with a solvent. As to the microparticle raw material in the present invention, a metal, a non-metal, or a compound of them may be used. The metal or the non-metal is not particularly restricted; and thus, all elements including a single body or an alloy thereof may be used. The compound in the present invention is not particularly restricted, while an illustrative example thereof includes the foregoing metals or non-metals in a form of a salt, an oxide, a nitride, a carbide, a complex, an organic salt, an organic complex, and an organic compound.

Although there is no particular restriction as to the metal salt or the non-metal salt, nitrate, nitrite, sulfate, sulfite, formate, acetate, phosphate, phosphite, hypophosphite, chloride, oxychloride, acetylacetonate, and so forth of the metals or the non-metals may be mentioned. Although there is no particular restriction as to the metal nitride of the present invention, such as for example, boron nitride (BN), carbon nitride ($C_3N_4$), silicon nitride ($Si_3N_4$), gallium nitride (GaN), indium nitride (InN), aluminum nitride (AlN), chromium nitride ($Cr_2N$) copper nitride ($Cu_3N$), iron nitride ($Fe_4N$), iron nitride ($Fe_3N$), lanthanum nitride (LaN), lithium nitride ($Li_3N$), magnesium nitride ($Mg_3N_2$), molybdenum nitride ($Mo_2N$) niobium nitride (NbN), tantalum nitride (TaN), titanium nitride (TiN), tungsten nitride ($W_2N$), tungsten nitride ($WN_2$), yttrium nitride (YN), and zirconium nitride (ZrN) may be mentioned. Although there is no particular restriction in the metal carbide of the present invention, such as for example, calcium carbide ($CaC_2$), silicon carbide (SiC), boron carbide ($B_4C$), tungsten carbide (WC), tungsten carbide ($W_2C$), titanium carbide (TiC), zirconium carbide (ZrC), and vanadium carbide ($VC_x$) may be mentioned.

The present invention may be carried out by mixing the foregoing microparticle raw material with a solvent, or preferably by dissolving or molecular-dispersing the said microparticles. Depending on the purpose, the microparticle raw material may be selected, as appropriate, singly or a plurality of them to carry out the present invention.

An illustrative example of the solvent to mix, dissolve or molecular-disperse the microparticle raw material includes water, an organic solvent, or a mixed solvent comprising a plurality of them. An illustrative example of the water includes tap water, ion-exchanged water, pure water, ultra-pure water, and RO water. An illustrative example of the organic solvent includes an alcohol compound solvent, an amide compound solvent, a ketone compound solvent, an ether compound solvent, an aromatic compound solvent, carbon disulfide, an aliphatic compound solvent, a nitrile compound solvent, a sulfoxide compound solvent, a halogen-containing compound solvent, an ester compound solvent, an ionic liquid, a carboxylic acid compound, and a sulfonic acid compound. These solvents may be used separately or as a mixture of a plurality of them.

In addition, the present invention may be carried out by mixing or dissolving a basic substance or an acidic substance in the foregoing solvents in the range not adversely affecting separation of the oxide microparticles or the hydroxide microparticles. An illustrative example of the basic substance includes a metal hydroxide such as sodium hydroxide and potassium hydroxide; a metal alkoxide such as sodium methoxide and sodium isopropoxide; and an amine compound such as triethylamine, diethylamino ethanol, and diethylamine. An illustrative example of the acidic substance includes an inorganic acid such as aqua regia, hydrochloric acid, nitric acid, fuming nitric acid, sulfuric acid, and fuming sulfuric acid; and an organic acid such as formic acid, acetic acid, chloroacetic acid, dichloroacetic acid, oxalic acid, trifluoroacetic acid, trichloroacetic acid, and citric acid. These basic or acidic substances may be used as a mixture with the various solvents as mentioned above, or each of the substances may be used separately. These basic or acidic substances may be used after they are mixed with various solvents in advance, as mentioned above to carryout the present invention; or they may be used by mixing these basic or acidic substances with the foregoing solvents just before separation of the oxide microparticles or the hydroxide microparticles by using respective separate and independent flow paths as mentioned later.

To explain the foregoing solvents in more detail, an illustrative example of the alcohol compound solvent includes a linear alcohol such as methanol, ethanol, n-propanol and n-butanol; a branched alcohol such as isopropanol, 2-butanol, tert-butanol and 1-methoxy-2-propanol; and a polyvalent alcohol such as ethylene glycol and diethylene glycol. An illustrative example of the ketone compound solvent includes acetone, methyl ethyl ketone, and cyclohexanone. An illustrative example of the ether compound solvent includes dimethyl ether, diethyl ether, tetrahydrofuran and propylene glycol monomethyl ether. An illustrative example of the aromatic compound solvent includes nitrobenzene, chlorobenzene, and dichlorobenzene. An illustrative example of the aliphatic compound solvent includes hexane. An illustrative example of the nitrile compound solvent includes acetonitrile. An illustrative example of the sulfoxide compound solvent includes dimethyl sulfoxide, diethyl sulfoxide, hexamethylene sulfoxide, and sulfolane. An illustrative example of the halogen-containing compound solvent includes chloroform, dichloromethane, trichloroethylene, and iodoform. An illustrative example of the ester compound solvent includes ethyl acetate, butyl acetate, methyl lactate, ethyl lactate, and 2-(1-methoxy)propyl acetate. An illustrative example of the ionic liquid includes a salt of 1-butyl-3-methyl imidazolium with PF6-(hexafluorophosphate ion). An illustrative example of the amide compound solvent includes N,N-dimethylformamide, 1-methyl-2-pyrrolidone, 2-pyrrolidinone, 1,3-dimethyl-2-imidazolidinone, 2-pyrrolidinone, ε-caprolactam, formamide, N-methyl formamide, acetamide, N-methylacetamide, N,N-dimethylacetamide, N-methylpropaneamide, and hexamethylphosphoric triamide. An illustrative example of the carboxylic compound includes 2,2-dichloropropionic acid and squaric acid. An illustrative example of the sulfonic acid compound includes methanesulfonic acid, p-toluenesulfonic acid, chlorosulfonic acid, and trifluoromethane sulfonic acid.

As to the microparticle-separating solution to separate the oxide microparticles or the hydroxide microparticles by mixing with the microparticle raw material solution, the same solvents as those mentioned above may be used. A solvent to mix, or preferably to dissolve or to molecular-disperse these microparticles, and a solvent to separate these microparticles are selected depending on the intended oxide, hydroxide, or hydroxylated oxide to carry out the present invention. In the microparticle-separating solution of the present invention, the above-mentioned solvents may be used singly or as a mixture of plurality of them; and in addition, these solvents may contain the foregoing acidic or basic substances.

To carryout the present invention, it is preferable that mixing of the fluid which contains the microparticle raw material solution with the fluid which contains the microparticle-separating solution be done by stirring and uniformly mixing these fluids in a thin film fluid formed between processing surfaces which are disposed in a position they are faced with each other so as to be able to approach to and separate from each other, at least one of which rotates relative to the other. As to the apparatus like this, for example, an apparatus based on the same principle as the one that is disclosed in Patent Document 4 which was filed by the present applicant may be used. By using the apparatus based on the principle like this, the isolatable oxide microparticles or hydroxide microparticles can be produced.

Hereinafter, embodiments of the above-mentioned apparatus will be explained by using the drawings.

Figure 2:
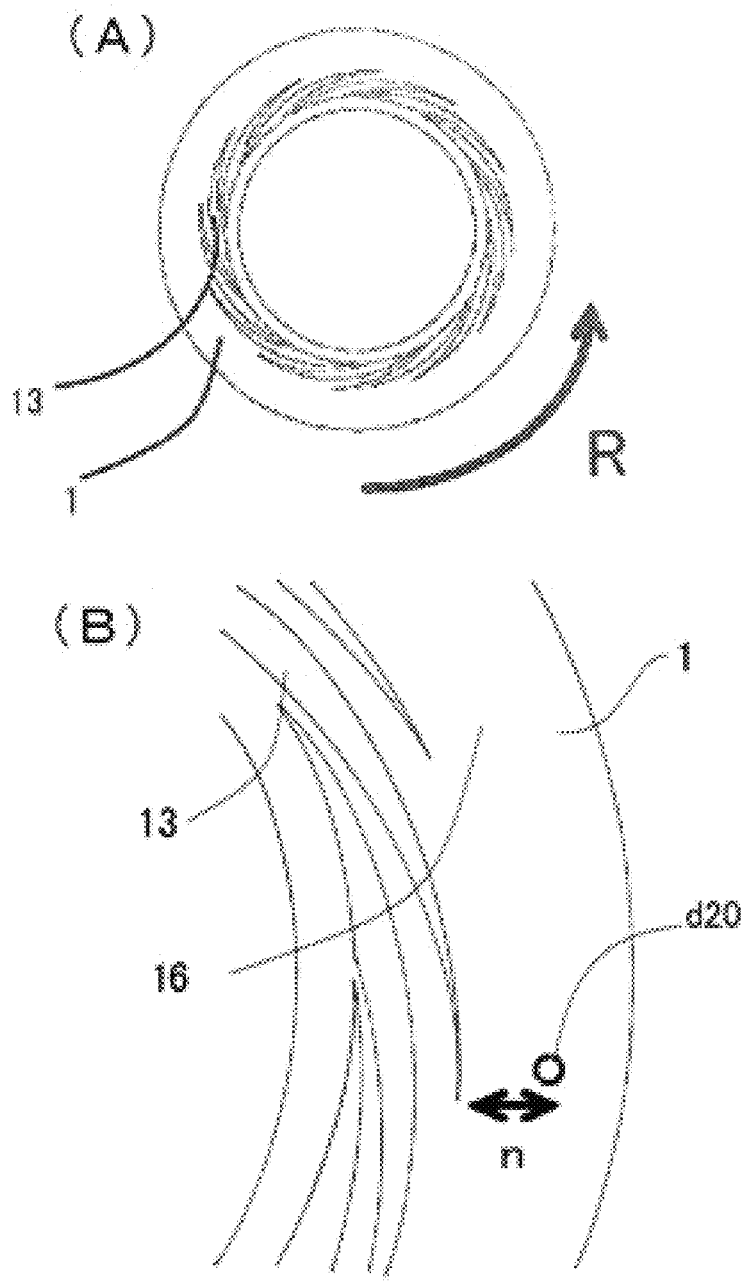
FIG. 2(A) is a schematic plane view of the first processing surface in the fluid processing apparatus shown in FIG. 1.
FIG. 2(B) is an enlarged view showing an important part of the processing surface in the apparatus.
Figure 3:
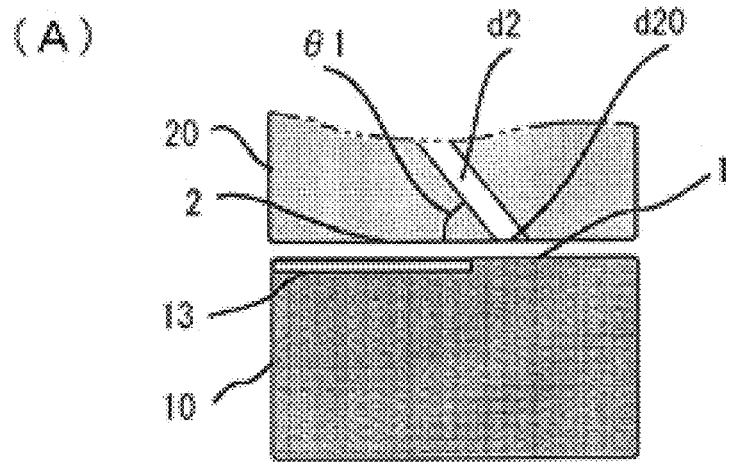
FIG. 3(A) is a sectional view of the second introduction member of the apparatus.
FIG. 3(B) is an enlarged view showing an important part of the processing surface for explaining the second introduction member.
Figure 3:
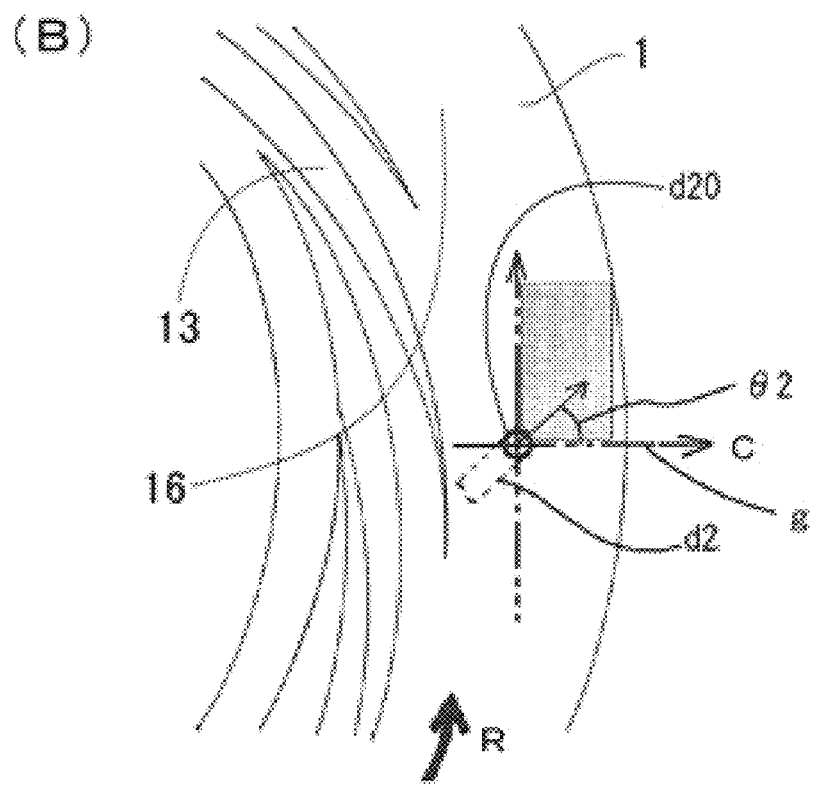

The fluid processing apparatus shown in FIG. 1 to FIG. 3 is similar to the apparatus described in Patent Document 4, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, front and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids as fluids to be processed are used, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually in the range of 1 mm or less, for example, 0.1 μm to 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive mechanism, a first introduction part d1, a second introduction part d2, and a fluid pressure imparting mechanism p.

As shown in FIG. 2(A), in this embodiment, the first processing member 10 is a circular body, specifically a disk with a ring form. Similarly, the second processing member 20 is a circular disk. Material of the processing members 10 and 20 is not only metal and carbon but also ceramics, sintered metal, abrasion-resistant steel, sapphire, and other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 µm to 1.0 µm, or more preferably 0.03 µm to 0.3 µm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to depart the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2, the flow paths through which the fluids flow, under the state that pressure is applied thereto by a fluid pressure imparting mechanism p consisting of various pumps, potential energy, and so on. In this embodiment, the first introduction part d1 is a path arranged in the center of the circular, second holder 21, and one end thereof is introduced into between the processing surfaces 1 and 2 from inside the circular, processing members 10 and 20. Through the second introduction part d2, the first fluid to be processed and the second fluid to be processed for reaction are introduced into between the processing surfaces 1 and 2. In this embodiment, the second introduction part d2 is a path arranged inside the second processing member 20, and one end thereof is open at the second processing surface 2. The first fluid to be processed which is pressurized with the fluid pressure imparting mechanism p is introduced from the first 10 and 20 so as to pass through between the first and processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate force (hereinafter, surface-approaching pressure) to press the first processing surface 1 of the first processing member 10 and the second processing surface 2 of the second processing member 20 in the direction to make them approach to each other. The mechanism generates a thin film fluid having minute thickness in a level of nanometer or micrometer by the balance between the surface-approaching pressure and the force to separate the processing surfaces 1 and 2 from each other, i.e., the force such as the fluid pressure. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces 1 and 2 by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23 (upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, in the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing a balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of micro-vibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like concave portion 13 extended toward an outer side from the central part of the first processing member 10, namely in a radius direction, may be formed. The concave portion 13 may be, as a plane view, curved or spirally extended on the first processing surface 1 as shown in FIG. 2(B), or, though not shown in the drawing, may be extended straight radially, or bent at a right angle, or jogged; and the concave portion may be continuous, intermittent, or branched. In addition, this concave portion 3 may be formed also on the second processing surface 2, or on both the first and second processing surfaces 1 and 2. By forming the concave portion 13 as mentioned above, the micro-pump effect can be obtained so that the fluid to be processed may be sucked into between the first and second processing surfaces 1 and 2.

The base end of the concave portion 13 reaches preferably inner circumference of the first processing member 10. The front end of the concave portion 13 extends in an outer circumferential direction (a downstream direction) of the first processing surface 1 with the depth thereof (cross-sectional area) being gradually shallower as going from the base end toward the front end.

Between the front end of the concave portion 13 and the outer periphery of the first processing surface 1 is arranged a flat surface 16 not having the concave portion 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the concave portion 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the concave portion 13 arranged in the first processing surface 1 in the radial direction is preferably about 0.5 mm or more. Especially in the case of separating microparticles from a fluid, it is preferable that mixing of a plurality of fluids to be processed and separation of the nanoparticles therefrom be effected under the condition of a laminar flow. The Shape of the opening d20 may be circular as shown in FIG. 2(B) and FIG. 3(B); or though not shown by a drawing, it may be a concentric circular ring with a ring-like disk shape which encloses the opening in the center of the processing surface 2. If the opening is in the shape of the circular ring, this circular ring opening may be continuous or discontinuous.

This second introduction part d2 may have directionality. For example, as shown in FIG. 3(A), the direction of introduction from the opening d20 of the second processing surface 2 is inclined at a predetermined elevation angle ($\theta 1$) relative to the second processing surface 2. The elevation angle ($\theta 1$) is set at more than 0° and less than 90°, and when the reaction speed is high, the angle ($\theta 1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta 2$) exists facing the rotation direction R from a reference line g, which is the line to the outward direction and in the radial direction passing through the opening d20. This angle ($\theta 2$) is also set preferably at more than 0° and less than 90°.

This angle ($\theta 2$) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member 10 and 20 is not particularly restricted in its form, size, and number; and these may be changed as appropriate. The opening for introduction may be arranged just before the first and second processing surfaces 1 and 2 or in the side of further upstream thereof.

In the apparatus mentioned above, the oxide microparticles or the hydroxide microparticles are separated by mixing the fluid that contains the microparticle raw material solution in which at least one microparticle raw material is mixed therein with the fluid that contains the microparticle-separating solution in the thin film fluid formed between the processing surfaces which are disposed in a position they are faced with each other so as to be able to approach to and separate from each other, at least one of which rotates relative to the other.

The reaction accompanied with separation of the oxide microparticles or hydroxide microparticles takes place in the apparatus shown in FIG. 1 under a forced and uniform mixing between the processing surfaces 1 and 2 arranged opposite to each other so as to be able to approach to and separate from each other, at least one of which rotates relative to the other.

Firstly, from one flow path, i.e., from the first introduction part d1, a first fluid containing a solution for separating microparticles is introduced into between the processing surfaces 1 and 2 arranged opposite to each other so as to be able to approach to and separate from each other, at least one of which rotates relative to the other, whereby forming a first fluid film (thin film fluid) between these processing surfaces.

Then, from a different flow path, i.e., from the second introducing part d2, a second fluid containing a microparticle raw material solution is introduced directly into the first fluid film (thin film fluid) formed between the processing surfaces 1 and 2.

Meanwhile, because it is good enough only if the reaction could be effected between the processing surfaces 1 and 2, as opposed to the foregoing method, a method wherein the second fluid is introduced from the first introduction part d1 and a solution containing the first fluid is introduced from the second introduction part d2 may also be used. That is, the expression "first" or "second" for each fluid has a meaning for merely discriminating an $n^{th}$ fluid among a plurality of the fluids present; and therefore, a third or more fluids can also exist.

As mentioned above, the first fluid and the second fluid are mixed between the processing surfaces 1 and 2 whose distance is fixed by the pressure balance between the supply pressure of the fluid to be processed and the pressure applied between the rotating processing surfaces so that the oxide microparticles or the hydroxide microparticles can be separated; and then, the dispersion solution of the oxide microparticles or the hydroxide microparticles can be discharged from between the processing surfaces 1 and 2 as the fluid which contains the oxide microparticles or the hydroxide microparticles.

In the present invention, the isolatable oxide microparticles or hydroxide microparticles can be produced by contacting and acting the microparticle-treating substance to the oxide microparticles or the hydroxide microparticles which are separated between the processing surfaces 1 and 2. In addition, by contacting and acting the microparticle-treating substance to the oxide microparticles or the hydroxide microparticles which are separated between the processing surfaces 1 and 2, dispersibility of the oxide microparticles or the hydroxide microparticles can be controlled. Further, the isolatable oxide microparticles or hydroxide microparticles which are obtained by contacting and acting the microparticle-treating substance to the oxide microparticles or the hydroxide microparticles which are separated between the processing surfaces 1 and 2 tend to have a smaller particle diameter as compared with the oxide microparticles or the hydroxide microparticles which are obtained without contacting and acting thereof to the microparticle-treating substance.

The foregoing microparticle-treating substance is not particularly restricted; but an acidic substance or hydrogen peroxide may be used. The acidic substance is not particularly restricted, though an illustrative example thereof includes an inorganic acid such as aqua regia, hydrochloric acid, nitric acid, fuming nitric acid, sulfuric acid, fuming sulfuric acid, hydrogen fluoride, perchloric acid, and hexafluorosilicic acid, or a salt of them; and an organic acid such as formic acid, acetic acid, chloroacetic acid, dichloroacetic acid, oxalic acid, trifluoroacetic acid, trichloroacetic acid, and citric acid, or a salt of them. These substances may be used singly or as a mixture of plurality of them.

The microparticle-treating substance is used preferably by mixing it with a solvent, or more preferably it is used as a microparticle-treating substance solution obtained by dissolving or molecular-dispersing the substance in a solvent.

As to the solvent to dissolve or molecular-disperse the microparticle-treating substance, the same solvents as those used to dissolve or molecular-disperse the microparticle raw material may be used.

According to one embodiment of the present invention, the fluid which contains the microparticle-treating substance solution is introduced as the third fluid into between the processing surfaces 1 and 2 after separating the oxide microparticles or the hydroxide microparticles between the processing surfaces 1 and 2 which are disposed in a position they are faced with each other so as to be able to approach to and separate from each other, at least one of which rotates relative to the other, and before discharging the dispersion solution of the oxide microparticles or the hydroxide microparticles from between the processing surfaces; by so doing, the dispersion solution of the oxide microparticles or the hydroxide microparticles can be mixed with the fluid which contains the microparticle-treating substance solution between the processing surfaces 1 and 2 so that the oxide microparticles or the hydroxide microparticles can be contacted with or acted to the microparticle-treating substance between the processing surfaces 1 and 2.

Figure 4:
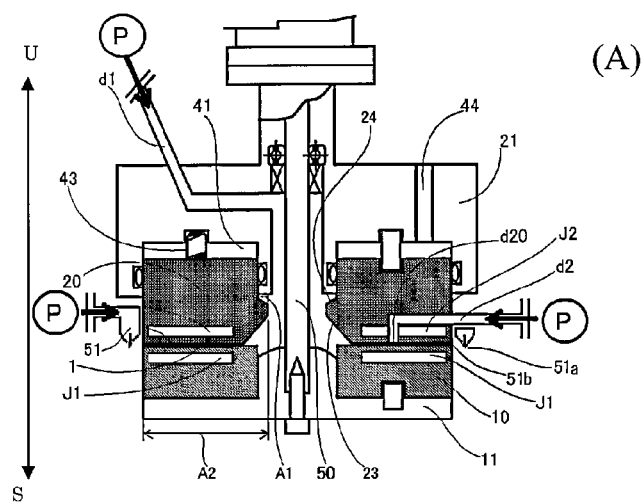
FIG. 4 These drawings show schematic sectional views of one example of an apparatus arranged in the fluid processing apparatus shown in FIG. 1, wherein with this apparatus the microparticle-treating substance is contacted with and acted to the oxide microparticles or the hydroxide microparticles which are separated between the processing surfaces of the said apparatus, wherein (A) shows the apparatus that is provided with a supplying apparatus of the fluid which contains the microparticle-treating substance solution, (B) shows the apparatus that is provided with a flow path through which the dispersion solution of the separated oxide microparticles or hydroxide microparticles passes as a converged stream as well as with a charging hole for the fluid which contains the microparticle-treating substance solution, and (C) shows the apparatus that is provided with a third introduction part to introduce the fluid which contains the microparticle-treating substance solution into the apparatus.
Figure 4:
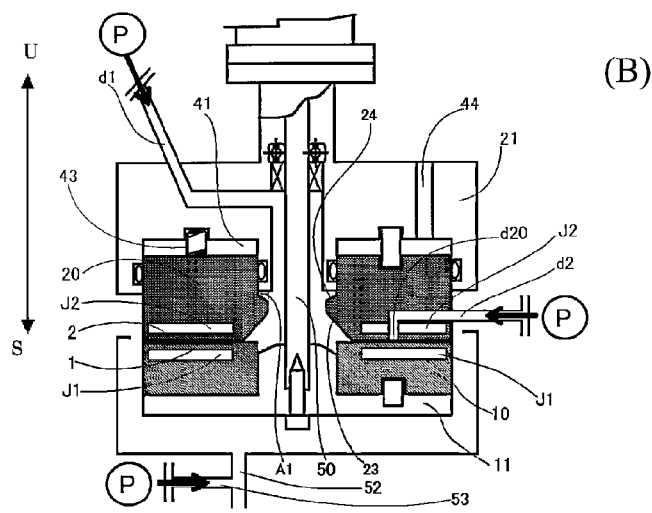
Figure 4:
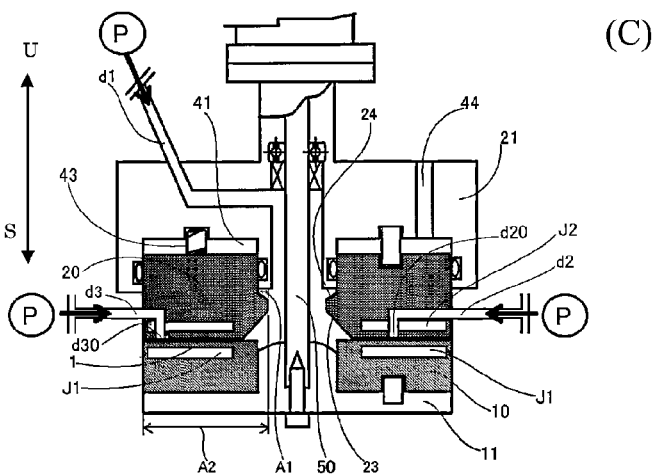

According to another embodiment of the present invention, the supplying apparatus 51 of the fluid which contains the microparticle-treating substance solution is arranged immediately after discharge of the dispersion solution of the oxide microparticles or the hydroxide microparticles from between the processing surfaces 1 and 2, these microparticles being separated in a thin film fluid formed between the processing surfaces 1 and 2 of the apparatus explained above, in other words, near the fluid discharge part 51b in the processing members 10 and 20; and the fluid which contains the microparticle-treating substance solution is sprayed or gradually added from this supplying apparatus 51 thereby mixing the dispersion solution of the oxide microparticles or the hydroxide microparticles with the fluid which contains the microparticle-treating substance solution (see FIG. 4(A)). More specifically, the supplying apparatus 51 is provided with a circular flow path which is connected to source of the fluid which contains the microparticle-treating substance solution via the pump P. This circular flow path is arranged in the position facing to the discharge part 51b of the processing surfaces 1 and 2 (in this example, upper part); and in the lower position of the circular flow path is formed the opening 51a. To carry out the present invention, preferably this opening 51a is formed of many small holes or is formed of continuous slits so that the fluid which contains the microparticle-treating substance solution may be supplied to and uniformly mixed with the dispersion solution which is discharged from the discharge part 51b. Meanwhile, this discharge part 51b is located in the most downstream side of the flow path which is forced by the processing surfaces 1 and 2 (in this example, the most outer circumference of the processing surfaces 1 and 2); and thus, the thin film fluid is released in this discharge part 51b from this force exerted by the processing surfaces 1 and 2 thereby discharging the fluid to a wider space of the flow path. Accordingly, the fluid which contains the microparticle-treating substance solution is supplied to the dispersion solution which is discharged as the widely spreading solution so that the microparticle-treating substance may be effectively contacted with and acted to the oxide microparticles or the hydroxide microparticles which are separated as mentioned above.

Alternatively, as shown in FIG. 4(B), the charging hole 53 to charge the fluid which contains the microparticle-treating substance solution may be arranged in the flow path 52 thorough which the dispersion solution of the discharged oxide microparticles or hydroxide microparticles passes as a converged stream; and through this charging hole 53, the fluid which contains the microparticle-treating substance solution may be charged. According to the method as mentioned above, there is a merit that a step of separating the oxide microparticles or the hydroxide microparticles and a step of mixing the fluid which contains the separated oxide microparticles or hydroxide microparticles with the fluid which contains the microparticle-treating substance solution can be done continuously.

In addition, as mentioned before, the processing apparatus may be provided with, in addition to the first introduction part d1 and the second introduction part d2, the third introduction part d3; and in this case, for example, each of the fluid which contains the microparticle-separating solution as the first fluid, the fluid which contains the microparticle raw material solution as the second fluid, and the fluid which contains the microparticle-treating substance solution as the third fluid may be introduced separately into the processing apparatus. In this case, the third introduction part d3 to introduce the fluid which contains microparticle-treating substance solution is arranged in the downstream side of the first introduction part dl and the second introduction part d2, or in more detail, the opening d30 of the third introduction part d3 is arranged in the downstream side of the opening d20 of the second introduction part; by so arranging, the microparticle-treating substance may be effectively contacted with and acted to the separated oxide microparticles or hydroxide microparticles (see, FIG. 4(C)).

By so doing, concentration and pressure of each of the fluids can be controlled so that the separation reaction and production of the isolatable oxide microparticles and hydroxide microparticles may be controlled more precisely. The same is applied if the fourth or more introduction parts are arranged; and by so doing, fluids to be introduced into the processing apparatus may be subdivided.

In other embodiment, there may be mentioned; a method wherein the microparticle-treating substance solution is charged into a container such as a beaker and a tank, and then, the dispersion solution of the oxide microparticles or the hydroxide microparticles which are discharged from the processing surfaces 1 and 2 is recovered in the container into which the microparticle-treating substance solution is charged; and a method wherein the dispersion solution of the oxide microparticles or the hydroxide microparticles which are discharged from the processing surfaces 1 and 2 is recovered in an empty container, and then, the microparticle-treating substance solution is charged into the container which contains the recovered dispersion solution of the oxide microparticles or the hydroxide microparticles. There is no particular restriction as to the stirring apparatus and the stirring method in mixing of the microparticle-treating substance solution with the dispersion solution of the oxide microparticles or the hydroxide microparticles in the container as mentioned above.

In the present invention, it is preferable that the microparticle-treating substance be made uniformly contact with and act to the oxide microparticles or the hydroxide microparticles which are separated between the processing surfaces 1 and 2; and thus, it is preferable that a step of separating the oxide microparticles or the hydroxide microparticles between the processing surfaces 1 and 2 and a step of mixing the fluid which contains the microparticle-treating substance solution with the fluid which contains the oxide microparticles or the hydroxide microparticles separated between the processing surfaces 1 and 2 be carried out within three seconds, or more preferably within one second. In more detail, the time between when, into the thin film fluid that is formed between the processing surfaces 1 and 2 by introducing, as the first fluid, any one of the fluid which contains the microparticle raw material solution and the fluid which contains the microparticle-separating solution from the first introduction part d1, one of the introduction path, any other one of the fluid which contains the microparticle raw material solution and the fluid which contains the microparticle-separating solution is introduced as the second fluid from the introduction part d2, the other flow path, and when the fluid which contains the oxide microparticles or the hydroxide microparticles which are separated between the processing surfaces 1 and 2 is mixed with the fluid which contains the microparticle-treating substance solution is preferably within three seconds, or more preferably within one second.

Alternatively, within the range not adversely affecting separation of the oxide microparticles or the hydroxide microparticles, the fluid which contains the microparticle-treating substance solution may be mixed with any one of the fluid which contains the microparticle raw material solution before separation of the oxide microparticles or the hydroxide microparticles and the fluid which contains the microparticle-separating solution or both; by so doing, the microparticle-treating substance may be contacted with and acted to the oxide microparticles or the hydroxide microparticles which are separated between the processing surfaces 1 and 2. For example, as mentioned above, the third introduction part d3 other than the first introduction part d1 and the second introduction part d2 is arranged in the processing apparatus; and through each introduction part, as the first fluid, any one of the fluid which contains the microparticle raw material solution and the fluid which contains the microparticle-separating solution, as the second fluid, any other one of the fluid which contains the microparticle raw material solution and the fluid which contains the microparticle-separating solution, and the third fluid, the fluid which contains the microparticle-treating substance solution may be separately introduced into the processing apparatus; by so doing, the fluid which contains the microparticle-treating substance solution may be mixed with any one of the fluid which contains the microparticle raw material solution before separation of the oxide microparticles or the hydroxide microparticles and the fluid which contains the microparticle-separating solution or both; and in this case, location of the opening d30 of the third introduction part d3 of the fluid which contains the microparticle-treating substance solution shall not be restricted.

In addition, state of the substance obtained by contacting and acting the microparticle-treating substance with the separated oxide microparticles or hydroxide microparticles is not particularly restricted. For example, by contacting and acting the microparticle-treating substance with hydroxide microparticles, isolatable oxide microparticles may be obtained or isolatable hydroxylated oxide microparticles may be obtained.

In addition, temperatures of the fluids to be processed such as the first, the second, and so on may be controlled; and temperature difference between the first fluid and the second fluid, or the like (namely, temperature difference among each of the supplied fluids to be processed) may be controlled either. In alternative practice, to control temperature and temperature difference of each of the supplied fluids to be processed, a mechanism with which temperature of each of the fluids to be processed is measured (temperature of the fluid before introduction to the processing apparatus, or in more detail, just before introduction between the processing surfaces 1 and 2) so that each of the fluids to be processed may be heated or cooled may be installed.

EXAMPLES

Hereinafter, the present invention will be explained in more detail by Examples; but the present invention is not limited only to these Examples.

It is to be noted here that the term "from the center" in the following Examples means "from the first introduction part d1" of the processing apparatus shown in FIG. 1; the first fluid means the first fluid to be processed as described before; and the second fluid means the second fluid to be processed that is introduced through the second introduction part d2 of the processing apparatus shown in FIG. 1, as described before.

In Examples, as shown in FIG. 1, a microparticle raw material solution (second fluid) is mixed with a microparticle-separating solution (first fluid) by using a reaction apparatus with which these fluids are uniformly dispersed, stirred, and mixed in a thin film fluid formed between the processing surfaces 1 and 2 which are disposed in a position they are faced with each other so as to be able to approach to and separate from each other, at least one of which rotates relative to the other, whereby effecting a separation reaction in the thin film fluid. Thereafter, a microparticle-treating substance solution (third fluid) is mixed therewith to produce isolatable oxide microparticles or hydroxide microparticles.

Examples 1 to 2 and Comparative Example 1

An aqueous ammonia solution (1% by mass) of the microparticle-separating solution as the first fluid with the liquid temperature of 80° C. was introduced from the center with supply pressure of 0.50 MPa and back pressure of 0.04 MPa and with rotation speed of 1700 rpm, while, as the second fluid, the microparticle raw material solution with the liquid temperature of 25° C. which was obtained by dissolving zirconium oxynitrate dihydrate (12.0% by mass) and yttrium nitrate nonahydrate (1.29% by mass) in water was introduced into between the processing surfaces 1 and 2 at the rate of 5 mL/min. The first fluid and the second fluid were mixed in the thin film fluid, whereby separating the yttria-stabilized zirconia hydrate microparticles between the processing surfaces 1 and 2 and then discharging the particles as the dispersion solution of the yttria-stabilized zirconia hydrate microparticles from the processing surfaces 1 and 2; and then, the discharged dispersion solution of the yttria-stabilized zirconia hydrate microparticles was mixed with the third fluid. As to this third fluid, the microparticle-treating substance solution, an aqueous nitric acid solution (1% by mass) or an aqueous hydrogen peroxide solution (1% by mass) was used. The dispersion solution of the discharged yttria-stabilized zirconia hydrate microparticles was mixed with the third fluid by gradually adding the third fluid to the position near the discharge part 51b outside the processing surfaces 1 and 2 at the rate of 50 mL/min and with the liquid temperature of 80° C., thereby effecting mixing of these fluids at the position near the discharge part 51b and in the flow path 52 at which the discharged solution was converged. The time between when the dispersion solution of the yttria-stabilized zirconia hydrate microparticles was discharged from the processing surfaces 1 and 2 and when it was mixed with the third fluid was approximately 0.5 seconds. The time between when the second fluid was introduced between the processing surfaces 1 and 2 and when the dispersion solution of the yttria-stabilized zirconia hydrate microparticles was discharged from the processing surfaces 1 and 2 was approximately 0.3 seconds for most of the microparticles; and thus, the time between when the second fluid was introduced between the processing surfaces 1 and 2 and when the dispersion solution of the yttria-stabilized zirconia hydrate microparticles which were discharged from the processing surfaces 1 and 2 was mixed with the third fluid was within one second. Meanwhile, respective liquid temperatures of the first to the third fluids were measured at the position just before the respective fluids were introduced into the processing apparatus.

Figure 5:
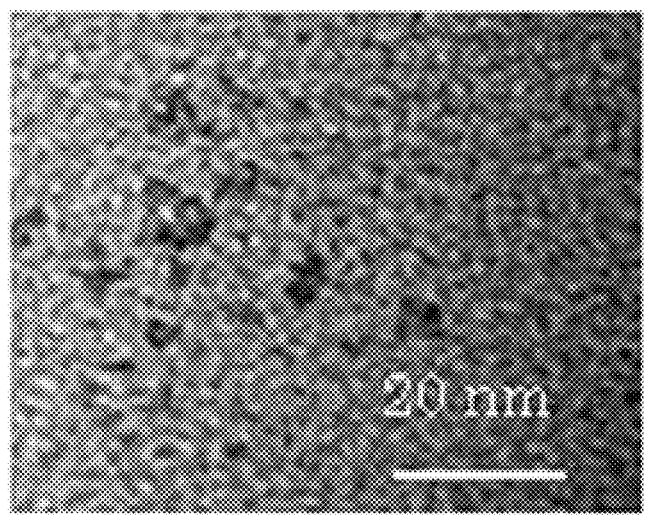
FIG. 5 These show (A) a TEM picture of microparticles of the yttria-stabilized zirconia hydrate before heat treatment and (B) a TEM picture of microparticles of the yttria-stabilized zirconia after heat treatment (these microparticles were prepared in Example 1 of the present invention).
Figure 5:
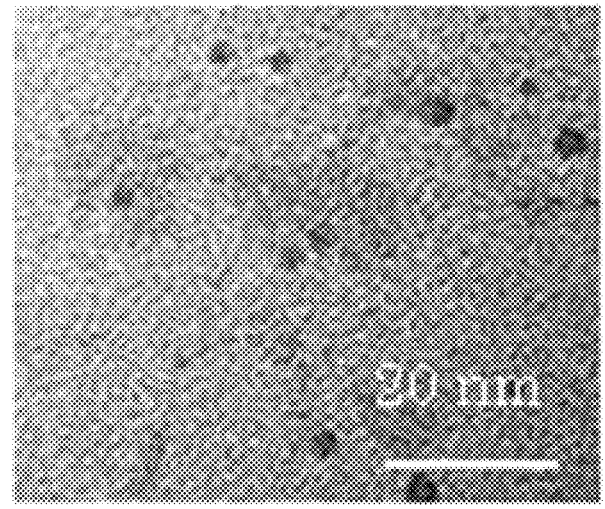
Figure 6:
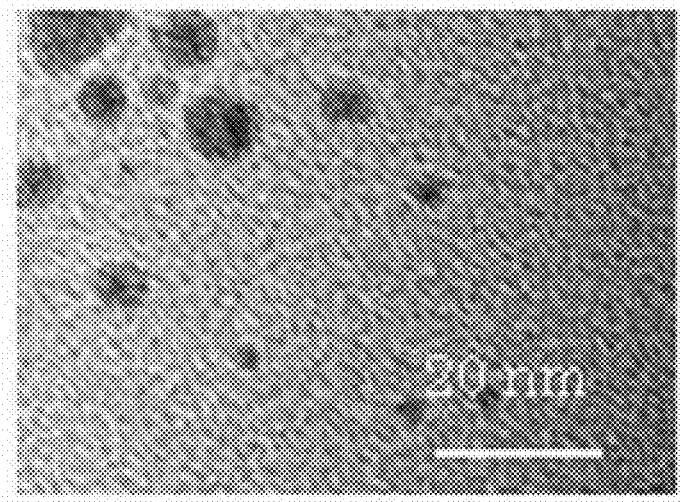
FIG. 6 These show (A) a TEM picture of microparticles of the yttria-stabilized zirconia hydrate before heat treatment and (B) a TEM picture of microparticles of the yttria-stabilized zirconia after heat treatment (these microparticles were prepared in Example 2 of the present invention).
Figure 6:
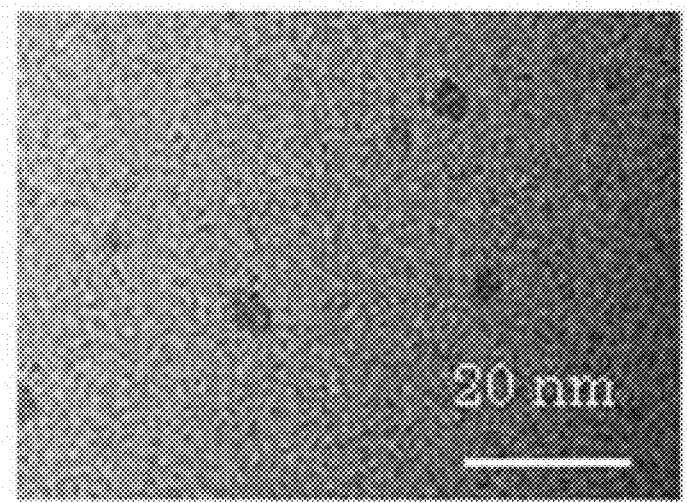
Figure 7:
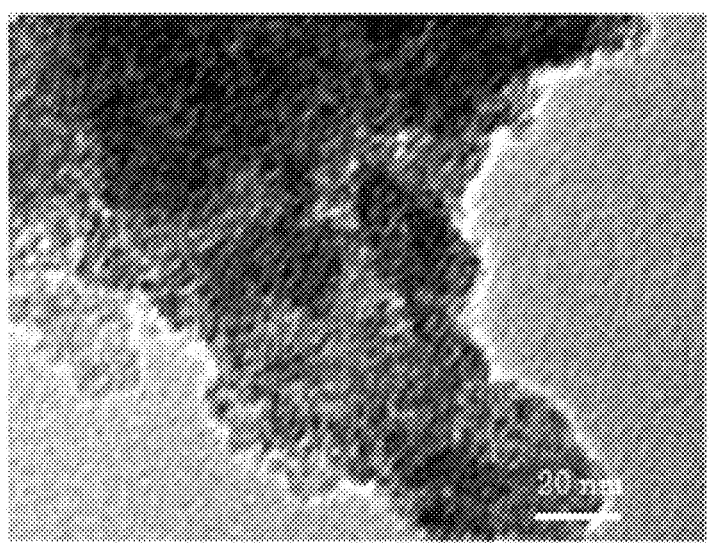
FIG. 7 These show (A) a TEM picture of microparticles of the yttria-stabilized zirconia hydrate before heat treatment and (B) a TEM picture of microparticles of the yttria-stabilized zirconia after heat treatment (these microparticles were prepared in Comparative Example 1 of the present invention).
Figure 7:
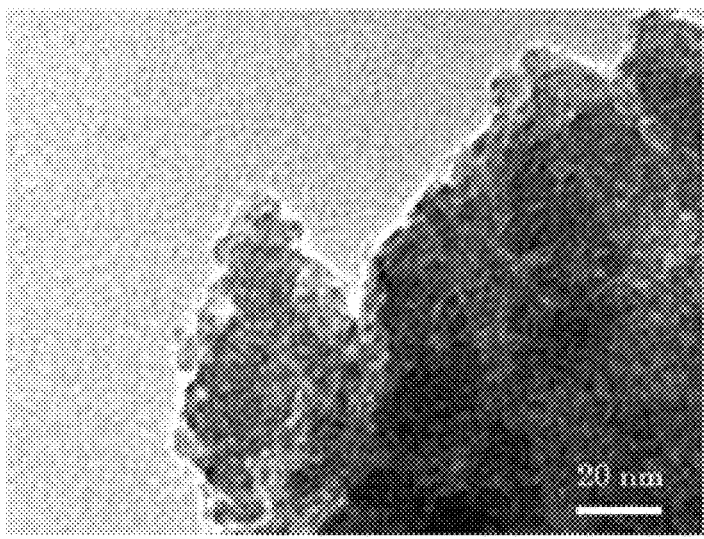

To remove impurities from the mixture solution of the discharged dispersion solution of the yttria-stabilized zirconia hydrate microparticles and the third fluid, the yttria-stabilized zirconia hydrate microparticles were loosely aggregated, and then, the yttria-stabilized zirconia hydrate microparticles were spun down by using a centrifugal separator (x8000 G); and after the supernatant was removed, the yttria-stabilized zirconia hydrate microparticles were redispersed by adding pure water and then spun down again by using a centrifugal separator. This washing operation was repeated for three times; and then, a finally obtained paste of the yttria-stabilized zirconia hydrate microparticles was dried at 60° C. under vacuum of −0.1 MPaG to obtain dried powders of the yttria-stabilized zirconia hydrate microparticles. Further, the obtained dried powders of the yttria-stabilized zirconia hydrate microparticles were subjected to the heat treatment at 400° C. for 4 hours. The results of the experiments by using the changed third fluid are shown in Table 1. For comparison with Examples 1 to 2, Comparative Example 1 was done as to the yttria-stabilized zirconia hydrate microparticles and the yttria-stabilized zirconia microparticles which were prepared without mixing the third fluid with the dispersion solution of the yttria-stabilized zirconia hydrate microparticles which were discharged from between the processing surfaces 1 and 2 in the same methods as Examples 1 to 2. TEM pictures of the yttria-stabilized zirconia hydrate microparticles before the heat treatment and TEM pictures of the yttria-stabilized zirconia microparticles after the heat treatment, obtained in Examples 1 to 2 and Comparative Example 1, are shown in FIG. 5 to FIG. 7. The dispersibility in Table 1 was judged to be "Good" when the yttria-stabilized zirconia hydrate microparticles or the yttria-stabilized zirconia microparticles were observed as dispersed loose particles in the TEM picture, and judged to be "Poor" when they were observed otherwise. A particle diameter of the dispersed microparticles shown in Table 1 was confirmed by observation with the TEM picture. From the TEM pictures of FIG. 5 to FIG. 7, it was confirmed that microparticles which were obtained by using the aqueous nitric acid solution or the aqueous hydrogen peroxide solution as the third fluid in Example 1 or Example 2 were dispersed till primary particles, on contrary to Comparative Example 1 in which the third fluid was not used. From Table 1 and FIG. 5 to FIG. 7, it was found that, by using the aqueous hydrogen peroxide solution or the aqueous nitric acid solution as the acidic substance, the dispersibility of the yttria-stabilized zirconia hydrate microparticles before the heat treatment and the yttria-stabilized zirconia microparticles obtained after the heat treatment could be improved.

TABLE 1

|  | Third fluid | Dispersed particle diameter (TEM diameter) (nm) | | Dispersibility | |
| --- | --- | --- | --- | --- | --- |
|  |  | Before heat treatment | After heat treatment | Before heat treatment | After heat treatment |
| Example 1 | Aqueous nitric acid solution (1% by mass) | 2 to 10 | 2 to 10 | Good | Good |
| Example 2 | Aqueous hydrogen peroxide solution (1% by mass) | 2 to 30 | 2 to 10 | Good | Good |
| Comparative Example 1 | None | 100 or more | 100 or more | Poor | Poor |

Examples 3 to 4 and Comparative Example 2

An aqueous sodium hydroxide solution (1% by mass) of the microparticle-separation solution as the first fluid with the liquid temperature of 80° C. was introduced from the center at the rate of 250 mL/min with supply pressure of 0.50 MPa and back pressure of 0.04 MPa and with rotation speed of 500 rpm, while, as the second fluid, the microparticle raw material solution with the liquid temperature of 25° C. which was obtained by dissolving magnesium chloride hexahydrate (10.0% by mass) in water was introduced into between the processing surfaces 1 and 2 at the rate of 10 mL/min. The first fluid and the second fluid were mixed in the thin film fluid, whereby separating the magnesium hydroxide microparticles between the processing surfaces 1 and 2 and discharging the particles from the processing surfaces 1 and 2 as the dispersion solution of the magnesium hydroxide microparticles. Thereafter, the discharged dispersion solution of the magnesium hydroxide microparticles was mixed with the third fluid; and then, they were stirred at 65° C. for two hours. This stirring treatment was done by using Clearmix 2.2S (manufactured by M Technique Co., Ltd.) with the rotation speed of 20000 rpm. As to this third fluid, the microparticle-treating substance solution, aqueous hydrogen peroxide solutions (0.5 to 1.0% by mass) were used. The dispersion solution of the discharged magnesium hydroxide microparticles was mixed with the third fluid by gradually adding the third fluid to the position near the discharge part 51b outside the processing surfaces 1 and 2 at the rate of 50 mL/min and with the liquid temperature of 80° C., thereby effecting mixing of these fluids at the position near the discharge part 51b and in the flow path 52 at which the discharged solution was converged. The time between when the dispersion solution of the magnesium hydroxide microparticles was discharged from the processing surfaces 1 and 2 and when it was mixed with the third fluid was approximately 0.5 seconds. The time between when the second fluid was introduced between the processing surfaces 1 and 2 and when the dispersion solution of the magnesium hydroxide microparticles was discharged from the processing surfaces 1 and 2 was approximately 0.3 seconds for most of the microparticles; and thus, the time between when the second fluid was introduced between the processing surfaces 1 and 2 and when the dispersion solution of the magnesium hydroxide microparticles which were discharged from the processing surfaces 1 and 2 was mixed with the third fluid was within one second. Meanwhile, respective liquid temperatures of the first to the third fluids were measured at the position just before the respective fluids were introduced into the processing apparatus.

To remove impurities from the mixture solution of the third fluid and the dispersion solution of the magnesium hydroxide microparticles after the stirring treatment, the magnesium hydroxide microparticles were loosely aggregated, and then, the magnesium hydroxide microparticles were spun down by using a centrifugal separator (x8000 G); and after the supernatant was removed, the magnesium hydroxide microparticles were redispersed by adding pure water and then spun down again by using a centrifugal separator. This washing operation was repeated for three times; and then, a finally obtained paste of the magnesium hydroxide microparticles was dried at 60° C. under vacuum of −0.1 MPaG to obtain dried powders of the magnesium hydroxide microparticles. Further, the obtained dried powders of the magnesium hydroxide microparticles were subjected to the heat treatment at 500° C. for 4 hours. As a result of measurement of the X-ray diffraction (XRD) of the dried microparticle powders before and after the heat treatment, it was confirmed that the magnesium hydroxide microparticles were changed to the magnesium oxide after the heat treatment.

Figure 8:
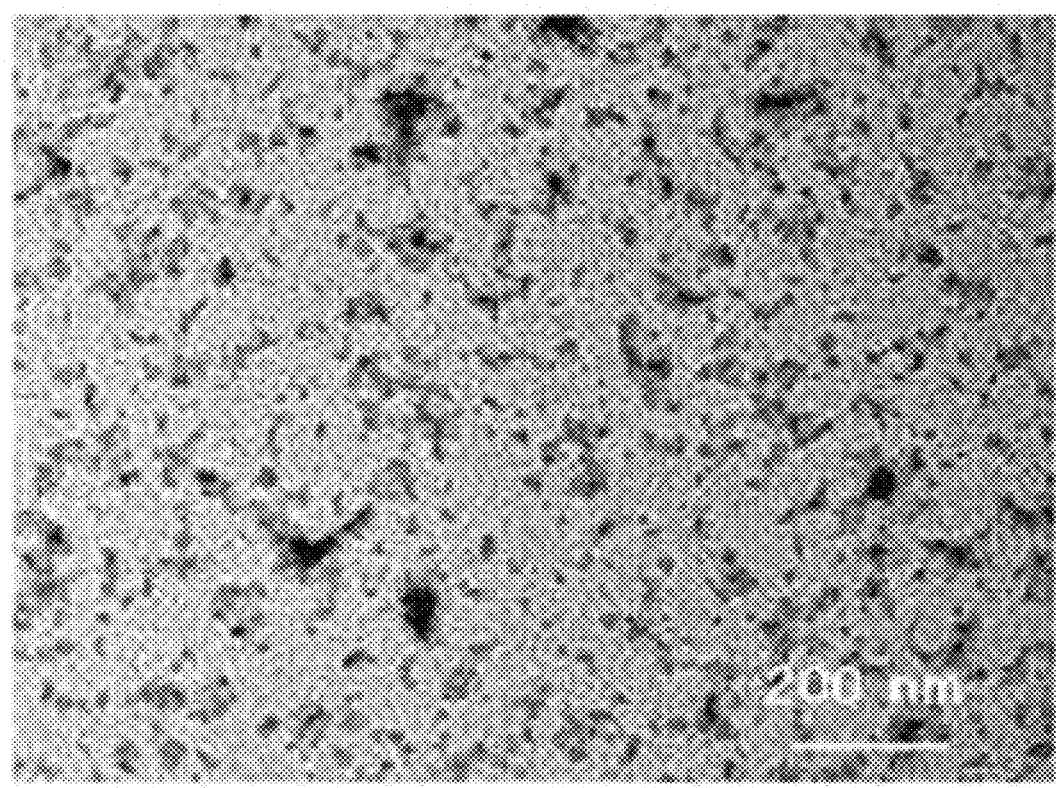
FIG. 8 This shows a TEM picture of microparticles of the magnesium oxide after heat treatment (the microparticles were prepared in Example 3 of the present invention).
Figure 9:
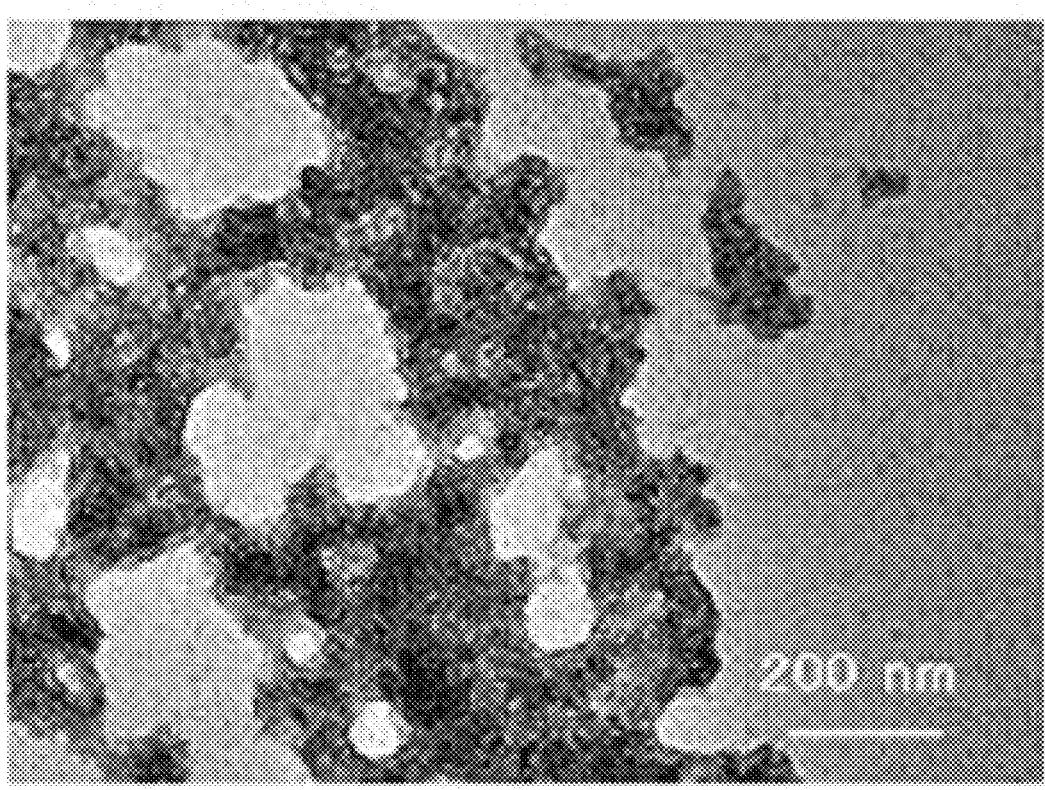
FIG. 9 This shows a TEM picture of microparticles of the magnesium oxide after heat treatment (the microparticles were prepared in Comparative Example 2 of the present invention).

The results of the experiments by changing the hydrogen peroxide concentration in the third fluid are shown in Table 2 (Examples 3 to 4). For comparison with Examples 3 to 4, Comparative Example 2 was done as to the magnesium hydroxide microparticles and the magnesium oxide microparticles which were prepared without mixing the third fluid with the dispersion solution of the magnesium hydroxide microparticles which were discharged from between the processing surfaces 1 and 2 in the same methods as Examples 3 to 4. TEM pictures of the magnesium oxide microparticles after the heat treatment in Example 3 and Comparative Example 2 are shown in FIG. 8 to FIG. 9. The dispersibility in Table 2 was judged to be "Good" when the magnesium hydroxide microparticles or the magnesium oxide microparticles were observed as dispersed loose particles in the TEM picture, and judged to be "Poor" when they were observed otherwise. From Table 2 and FIG. 8 to FIG. 9, it was found that, by using the aqueous hydrogen peroxide solution as the third fluid, the dispersibility of the magnesium hydroxide microparticles before the heat treatment and the magnesium oxide microparticles after the heat treatment could be improved. In addition, the dispersibility of the magnesium hydroxide microparticles before the heat treatment and the magnesium oxide microparticles after the heat treatment could be controlled by mixing the discharged dispersion solution of the magnesium hydroxide microparticles with the third fluid of the aqueous hydrogen peroxide solution thereby making the magnesium hydroxide microparticles contact with and act to hydrogen peroxide. As to concentration of hydrogen peroxide in the aqueous hydrogen peroxide solution, even if a comparatively dilute aqueous hydrogen peroxide solution was used for mixing with the discharged dispersion solution of the magnesium hydroxide microparticles, the dispersibility of the magnesium hydroxide microparticles before the heat treatment and the magnesium oxide microparticles after the heat treatment could be controlled. From the results as shown above, it was confirmed that the isolatable magnesium hydroxide microparticles and magnesium oxide microparticles can be obtained by mixing the dispersion solution of the magnesium hydroxide microparticles which are discharged from the processing surfaces 1 and 2 with the aqueous hydrogen peroxide solution thereby making the magnesium hydroxide microparticles contact with and act to hydrogen peroxide.

TABLE 2

| | | Dispersibility | |
|---|---|---|---|
| | Third fluid | Before heat treatment: Mg(OH)$_2$ | After heat treatment: MgO |
| Example 3 | Aqueous hydrogen peroxide solution (0.5% by mass) | Good | Good |
| Example 4 | Aqueous hydrogen peroxide solution (1.0% by mass) | Good | Good |
| Comparative Example 2 | None | Poor | Poor |

Examples 5 to 6 and Comparative Examples 3 to 5

Microparticle-separation solution of an aqueous ammonia solution (1% by mass), isopropyl alcohol (IPA), or acetone was introduced as the first fluid from the center with supply pressure of 0.50 MPa and back pressure of 0.04 MPa and with rotation speed of 1700 rpm, while, as the second fluid, the microparticle raw material solution of an aqueous titanyl sulfate solution (10% by mass) or an aqueous titanium tetrachloride solution (10% by mass) with the liquid temperature thereof being 25° C. was introduced into between the processing surfaces 1 and 2 at the rate of 5 mL/min. The first fluid and the second fluid were mixed in the thin film fluid, whereby separating the titanium dioxide microparticles between the processing surfaces 1 and 2 and discharging the particles as the dispersion solution of the titanium dioxide microparticles from the processing surfaces 1 and 2. Thereafter, the discharged dispersion solution of the titanium dioxide microparticles was mixed with the third fluid; and then, they were allowed to stand or stirred at 65 to 80° C. for four hours. This stirring treatment was done by using a magnetic stirrer with the rotation speed of 600 rpm in a water bath. As to this third fluid of the microparticle-treating substance solution, an aqueous nitric acid solution (1% by mass) was used. In example 5, the discharged dispersion solution of the titanium dioxide microparticles was mixed with the third fluid by gradually adding the third fluid to the position near the discharge part 51b outside the processing surfaces 1 and 2 at the rate of 50 mL/min and with the liquid temperature of 80° C., thereby effecting mixing of these fluids at the position near the discharge part 51b and in the flow path 52 at which the discharged solution was converged. In Example 6, into the third fluid which was previously prepared in a plastic container was continuously mixed the dispersion solution of the titanium dioxide microparticles discharged from the processing surfaces 1 and 2 within 0.6 seconds after discharge. The time between when the dispersion solution of the titanium dioxide microparticles was discharged from the processing surfaces 1 and 2 and when it was mixed with the third fluid was approximately 0.6 seconds. The time between when the second fluid was introduced between the processing surfaces 1 and 2 and when the dispersion solution of the titanium dioxide microparticles was discharged from the processing surfaces 1 and 2 was approximately 0.3 seconds for most of the microparticles; and thus, the time between when the second fluid was introduced between the processing surfaces 1 and 2 and when the dispersion solution of the titanium dioxide microparticles which were discharged from the processing surfaces 1 and 2 was mixed with the third fluid was within one second. Meanwhile, respective liquid temperatures of the first to the third fluids were measured at the position just before the respective fluids were introduced into the processing apparatus; and the liquid temperature of the first fluid is shown in Table 3.

To remove impurities from the mixture solution of the discharged dispersion solution of the titanium dioxide microparticles and the third fluid, the titanium dioxide microparticles were loosely aggregated, and then, the titanium dioxide microparticles were spun down by using a centrifugal separator (x8000 G); and after the supernatant was removed, the titanium dioxide microparticles were redispersed by adding pure water and then spun down again by using a centrifugal separator. This washing operation was repeated for three times; and then, a finally obtained paste of the titanium dioxide microparticles was dried at 60° C. under vacuum of −0.1 MPaG.

Figure 10:
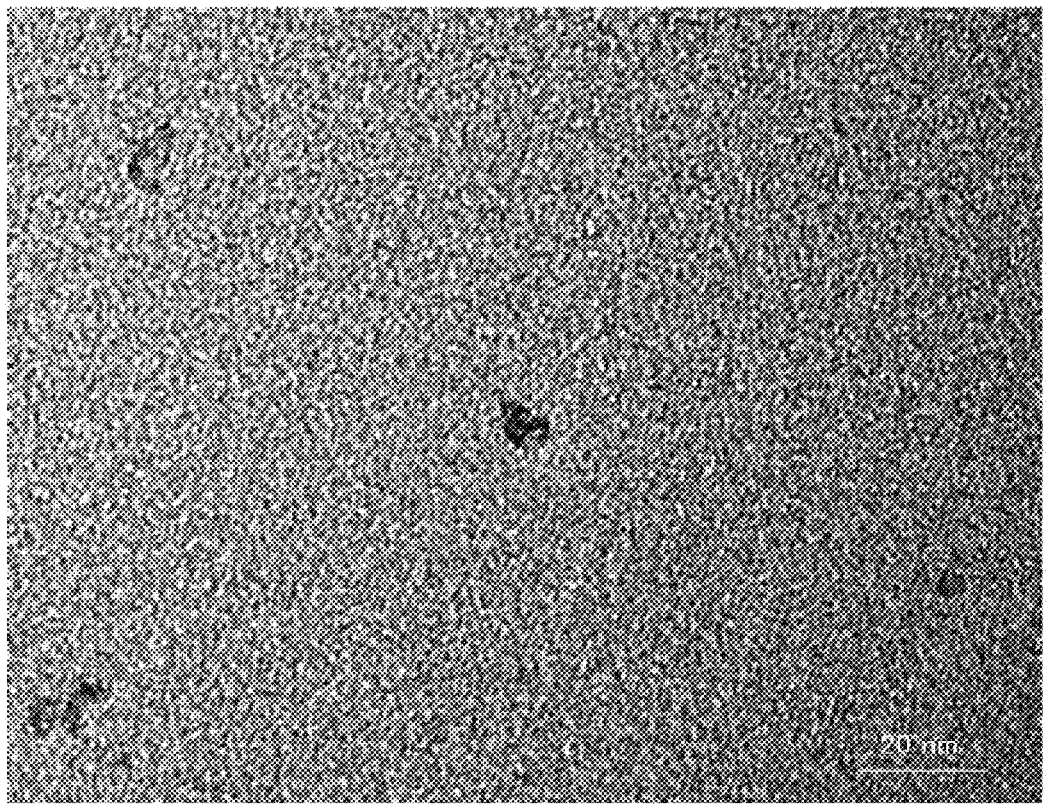
FIG. 10 This shows a TEM picture of microparticles of the titanium dioxide (the microparticles were prepared in Example 6 of the present invention).

The results of the experiments by changing the conditions are shown in Table 3. For comparison with Examples 5 to 6, Comparative Examples 3 to 5 were done as to the titanium dioxide microparticles which were prepared without mixing the third fluid with the dispersion solution of the titanium dioxide microparticles which were discharged from the processing surfaces 1 and 2 in the same methods as Examples 5 to 6. The dispersibility in Table 3 was judged to be "Good" when the titanium dioxide microparticles were observed as dispersed loose particles in the TEM picture, and judged to be "Poor" when they were observed otherwise. In the item of "Primary particle diameter" in Table 3, the primary particle diameter obtained by the TEM observation was recorded. In FIG. 10, the TEM picture of the titanium dioxide microparticles obtained in Example 6 is shown. From Table 3 and FIG. 10, it was found that, by using the aqueous nitric acid solution as the acidic substance in the third fluid, the dispersibility of the titanium dioxide microparticles could be improved. In addition, it was found that, the dispersibility of the titanium dioxide microparticles could be improved by using the aqueous nitric acid solution as the acidic substance in the third fluid regardless of the kind of the first fluid and the second fluid. Further, it was found that, the dispersibility of the titanium dioxide microparticles could be improved by using the aqueous nitric acid solution as the acidic substance in the third fluid regardless of the treatment methods, i.e., whether the mixed solution of the discharged dispersion solution of the titanium dioxide microparticles and the third fluid was allowed to stand or stirred. From the results of all of Examples and Comparative Examples, it was confirmed that the dispersibility of oxide microparticles or hydroxide microparticles before and after the heat treatment can be controlled and that isolatable oxide microparticles or hydroxide microparticles can be obtained if, immediately after the oxide microparticles or hydroxide microparticles which are separated between the processing surfaces 1 and 2 are discharged from the processing surfaces 1 and 2 as the dispersion solution of the oxide microparticles or hydroxide microparticles, the dispersion solution of the oxide microparticles or hydroxide microparticles is mixed with the microparticle-treating substance solution thereby making the oxide microparticles or the hydroxide microparticles contact with and act to the microparticle-treating substance.

TABLE 3

| | First fluid | Temperature of first fluid (° C.) | Second fluid | Third fluid | Standing or stirring | Primary particle diameter (nm) | Dispersibility |
|---|---|---|---|---|---|---|---|
| Example 5 | IPA | 65 | Aqueous titanium tetrachloride solution (10% by mass) | Aqueous nitric acid solution (1% by mass) | Stirring | 20 | Good |
| Example 6 | Aqueous ammonia solution (1% by mass) | 25 | Aqueous titanyl sulfate solution (10% by mass) | Aqueous nitric acid solution (1% by mass) | standing | 5 | Good |
| Comparative Example 3 | IPA | 65 | Aqueous titanium tetrachloride solution (10% by mass) | None | standing | 10 | Poor |
| Comparative Example 4 | Aqueous ammonia solution (1% by mass) | 25 | Aqueous titanyl sulfate solution (10% by mass) | None | No treatment | 5 | Poor |
| Comparative Example 5 | Acetone | 65 | Aqueous titanium tetrachloride solution (10% by mass) | None | Stirring | 30 | Poor |

EXPLANATION OF REFERENCE NUMERALS 1 first processing surface
2 second processing surface
10 first processing member
11 first holder
20 second processing member
21 second holder
51a opening
51b discharge part
d1 first introduction part
d2 second introduction part
d20 opening
d30 opening
P fluid pressure imparting mechanism

The invention claimed is:

1. A method for producing isolatable oxide microparticles or hydroxide microparticles, wherein
each of (I) a microparticle raw material solution which is obtained by mixing at least one microparticle raw material with a solvent, (II) a microparticle-separating solution, and (III) a microparticle-treating substance solution which is obtained by mixing at least one microparticle-treating substance with a solvent is prepared, wherein the method comprises:
(IV) a step of separating oxide microparticles or hydroxide microparticles, wherein
at least two fluids to be processed are used:
out of them, at least one fluid is the fluid which contains the microparticle raw material solution and at least one fluid other than the microparticle raw material solution is the fluid which contains the microparticle-separating solution, wherein
the fluid which contains the microparticle raw material solution is mixed with the fluid which contains the microparticle-separating solution in a thin film fluid formed between at least two processing surfaces which are disposed in a position they are faced with each other so as to be able to approach to and separate from each other, at least one of which rotates relative to the other, and
(V) a step of mixing a fluid which contains the oxide microparticles or the hydroxide microparticles separated in the step (IV) with the fluid which contains the microparticle-treating substance solution, wherein
the microparticle-treating substance is a substance which controls dispersibility of the said separated oxide maicroparticles or hydroxide microparticles.

2. The method for producing isolatable oxide microparticles or hydroxide microparticles according to claim 1, wherein
any one of the fluid which contains the microparticle raw material solution and the fluid which contains the microparticle-separating solution passes between the processing surfaces with forming the thin film fluid,
a separate introduction path independent of a flow path through which any one of the fluids passes is arranged,
at least any one of the at least two processing surfaces is provided with an opening to the introduction path,
any other one of the fluid which contains the microparticle raw material solution and the fluid which contains the microparticle-separating solution is introduced between the processing surfaces through the opening, whereby mixing the fluid which contains the microparticle raw material solution with the fluid which contains the microparticle-separating solution in the thin film fluid.

3. The method for producing isolatable oxide microparticles or hydroxide microparticles according to claim 1, wherein the method comprises:
a step of separating oxide microparticles or hydroxylated oxide microparticles by mixing the fluid which contains the microparticle raw material solution with the fluid which contains the microparticle-separating solution in the thin film fluid formed between at least two processing surfaces which are disposed in a position they are faced with each other so as to be able to approach to and separate from each other, at least one of which rotates relative to the other, and
a step of mixing the fluid which contains the oxide microparticles or the hydroxide microparticles separated in the above-mentioned step with the fluid which contains the microparticle-treating substance solution, wherein these steps are carried out continuously.

4. The method for producing isolatable oxide microparticles or hydroxide microparticles according to claim 3, wherein
at least any one of the at least two processing surfaces is provided with an opening to introduce the fluid which contains the microparticle-treating substance solution between the processing surfaces,
the fluid which contains the microparticle raw material solution is mixed with the fluid which contains the microparticle-separating solution in the thin film fluid to separate oxide microparticles or hydroxide microparticles, and thereafter,
the microparticle-treating substance is contacted with and acted to the separated oxide microparticles or hydroxide microparticles in the thin film fluid.

5. The method for producing isolatable oxide microparticles or hydroxide microparticles according to claim 3, wherein
an opening to supply the fluid which contains the microparticle-treating substance solution is arranged in a position to face a discharge part of the at least two processing surfaces,
the fluid which contains the microparticle raw material solution is mixed with the fluid which contains the microparticle-separating solution in the thin film fluid to separate the oxide microparticles or the hydroxide microparticles thereby discharging the fluid which contains the oxide microparticles or the hydroxide microparticles through the discharge part, and immediately thereafter,
the microparticle-treating substance is contacted with and acted to the separated oxide microparticles or hydroxide microparticles.

6. The method for producing isolatable oxide microparticles or hydroxide microparticles according to claim 1, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

7. The method for producing isolatable oxide microparticle or hydroxide microparticle according to claim 1, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

8. The method for producing isolatable oxide microparticles or hydroxide microparticles according to claim 1, wherein the microparticle-treating substance is an acidic substance or hydrogen peroxide.

9. The method for producing isolatable oxide microparticles or hydroxide microparticles according to claim 2, wherein the method comprises:
a step of separating oxide microparticles or hydroxylated oxide microparticles by mixing the fluid which contains the microparticle raw material solution with the fluid which contains the microparticle-separating solution in the thin film fluid formed between at least two processing surfaces which are disposed in a position they are faced with each other so as to be able to approach to and separate from each other, at least one of which rotates relative to the other, and
a step of mixing the fluid which contains the oxide microparticles or the hydroxide microparticles separated in the above-mentioned step with the fluid which contains the microparticle-treating substance solution, wherein these steps are carried out continuously.

10. The method for producing isolatable oxide microparticles or hydroxide microparticles according to claim 2, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

11. The method for producing isolatable oxide microparticles or hydroxide microparticles according to claim 3, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

12. The method for producing isolatable oxide microparticles or hydroxide microparticles according to claim 4, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

13. The method for producing isolatable oxide microparticles or hydroxide microparticles according to claim 5, wherein a step of mixing the fluid which contains the separated oxide microparticles or hydroxide microparticles with the fluid which contains the microparticle-treating substance solution is carried out within one second after the step of separating the oxide microparticles or the hydroxide microparticles.

14. The method for producing isolatable oxide microparticle or hydroxide microparticle according to claim 2, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

15. The method for producing isolatable oxide microparticle or hydroxide microparticle according to claim 3, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

16. The method for producing isolatable oxide microparticle or hydroxide microparticle according to claim 4, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

17. The method for producing isolatable oxide microparticle or hydroxide microparticle according to claim 5, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

18. The method for producing isolatable oxide microparticle or hydroxide microparticle according to claim 6, wherein dispersibility of the oxide microparticles or the hydroxide microparticles is controlled by controlling concentration of the microparticle-treating substance in the microparticle-treating substance solution that is contacted with and acted to the separated oxide microparticles or hydroxide microparticles.

19. The method for producing isolatable oxide microparticles or hydroxide microparticles according to claim 2, wherein the microparticle-treating substance is an acidic substance or hydrogen peroxide.

20. The method for producing isolatable oxide microparticles or hydroxide microparticles according to claim 3, wherein the microparticle-treating substance is an acidic substance or hydrogen peroxide.

* * * * *